Figure 1:
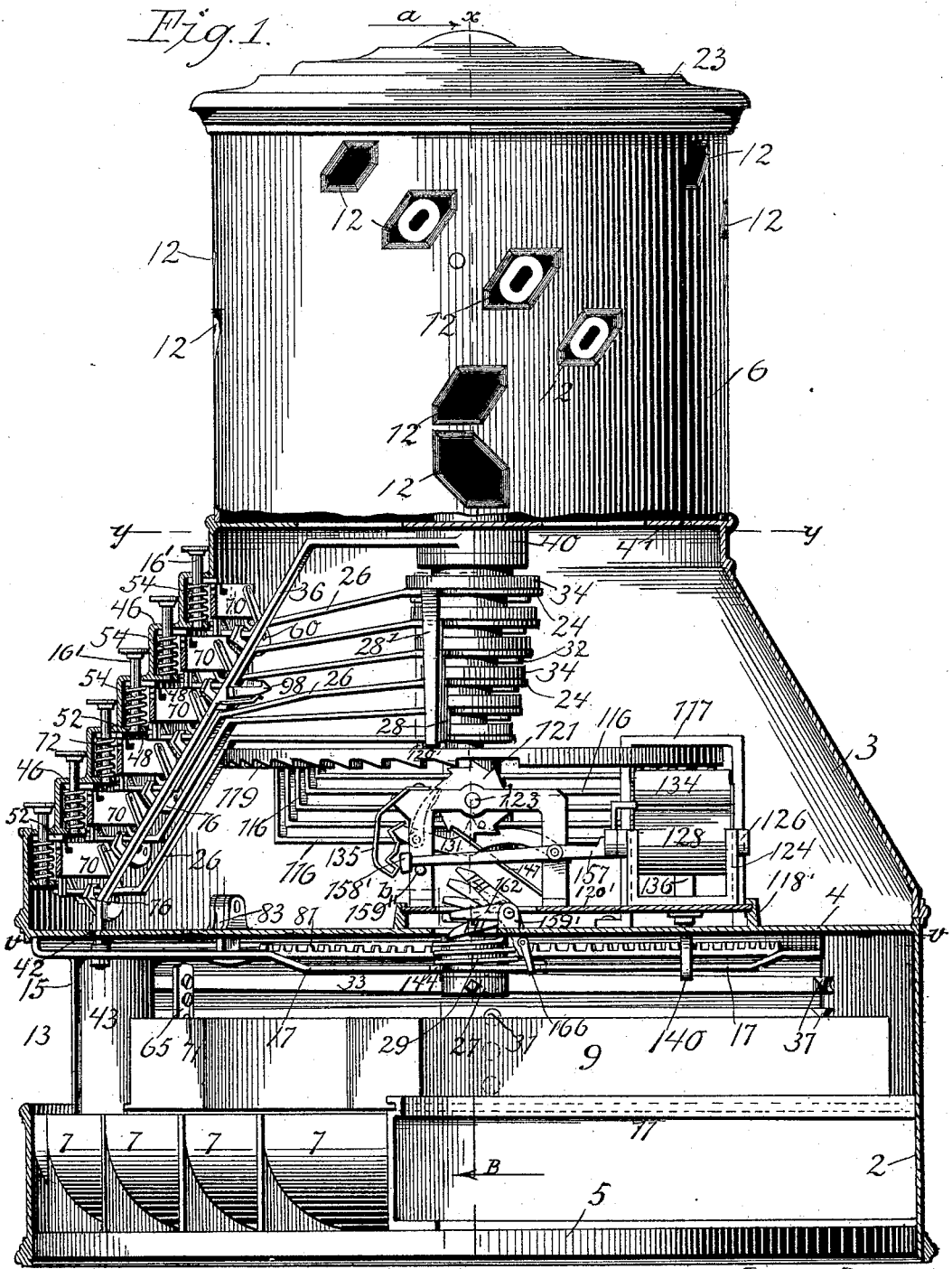

(No Model.) 8 Sheets—Sheet 3.

P. J. LANDIN & F. L. WALKER.
CASH REGISTER, INDICATOR, AND RECORDER.

No. 526,401. Patented Sept. 25, 1894.

Witnesses
J Jensen
C. E. Van Doren

Inventors.
Peter J. Landin
Fletcher L. Walker

By Paul & Merwin attys (No Model.) 8 Sheets—Sheet 5.

P. J. LANDIN & F. L. WALKER.
CASH REGISTER, INDICATOR, AND RECORDER.

No. 526,401. Patented Sept. 25, 1894.

Witnesses:

Inventors:
Peter J. Landin,
Fletcher L. Walker.
By Paul Merwin Att'ys (No Model.) 8 Sheets—Sheet 6.
P. J. LANDIN & F. L. WALKER.
CASH REGISTER, INDICATOR, AND RECORDER.
No. 526,401. Patented Sept. 25, 1894.
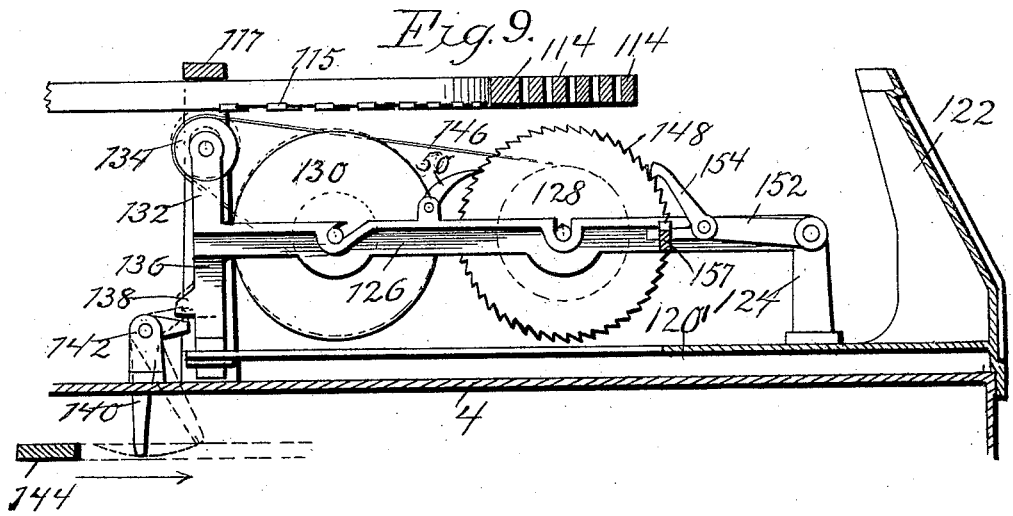
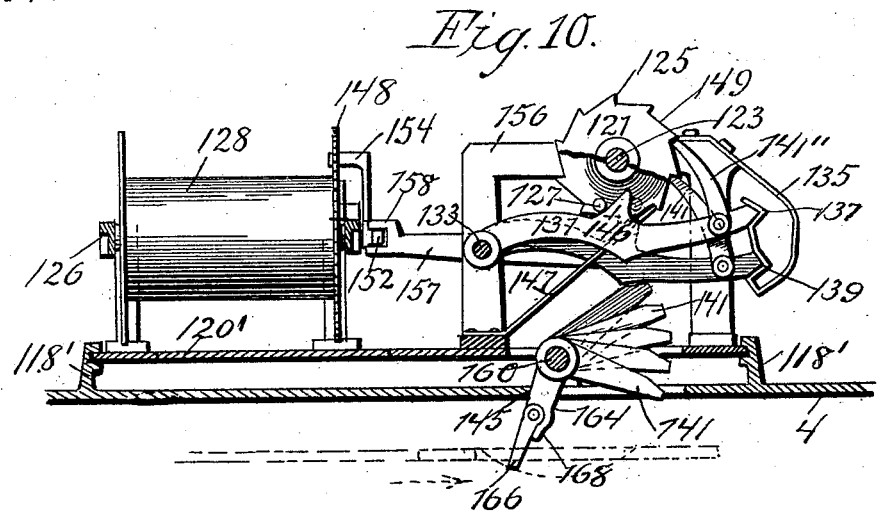
Witnesses:
J. Jessen.
C. E. Van Doren.
Inventors:
Peter J. Landin
Fletcher L. Walker
By Paul & Merwin
Attys (No Model.) 8 Sheets—Sheet 7.

P. J. LANDIN & F. L. WALKER.
CASH REGISTER, INDICATOR, AND RECORDER.

No. 526,401. Patented Sept. 25, 1894.

Witnesses:
J. Jessen.
C. E. Van Doren.

Inventors:
Peter J. Landin.
Fletcher L. Walker.
By Paul _____ attys (No Model.) 8 Sheets—Sheet 8.
P. J. LANDIN & F. L. WALKER.
CASH REGISTER, INDICATOR, AND RECORDER.
No. 526,401. Patented Sept. 25, 1894.
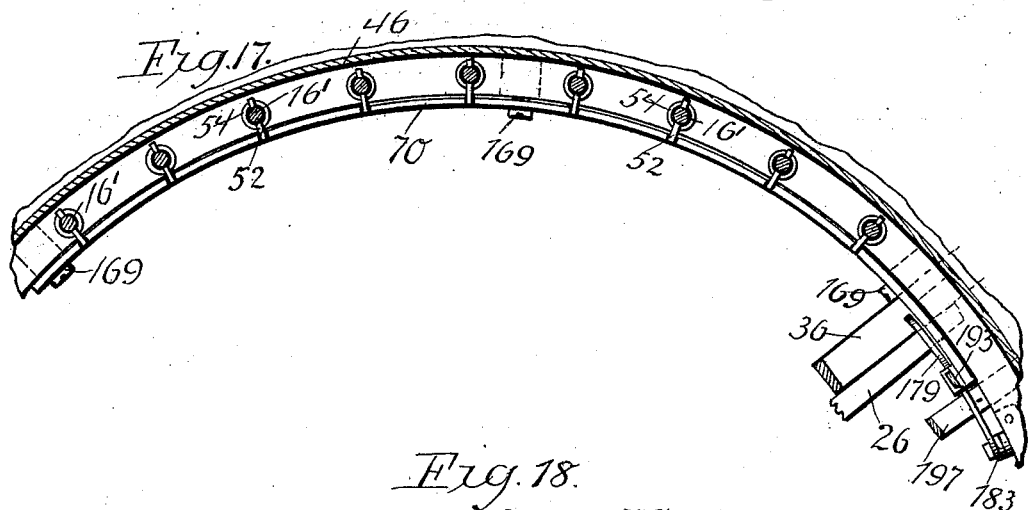
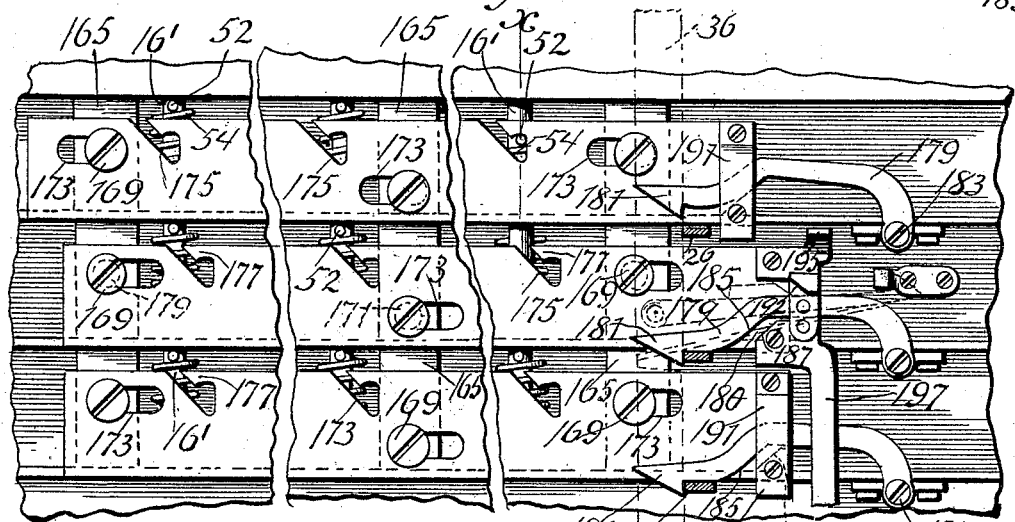
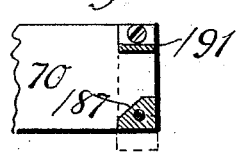
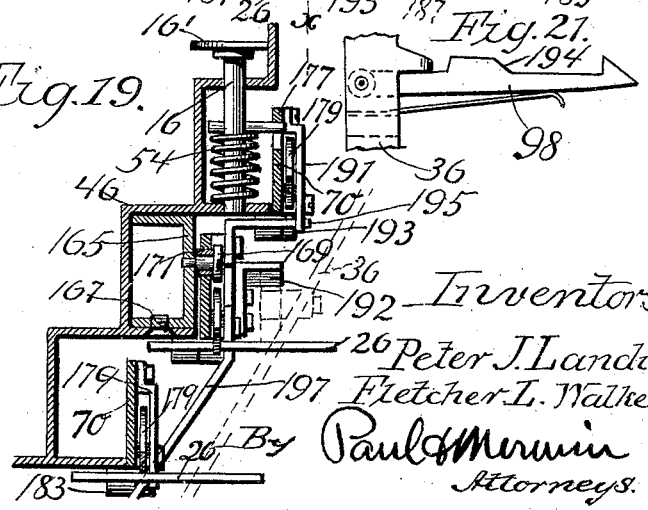
Witnesses:
J. Jensen.
C. E. Van Doren.
Inventors:
Peter J. Landin
Fletcher L. Walker
By Paul A. Merwin
Attorneys.
THE NORRIS PETERS CO., PHOTO-LITHO., WASHINGTON, D. C.

UNITED STATES PATENT OFFICE.

PETER J. LANDIN AND FLETCHER L. WALKER, OF MINNEAPOLIS, MINNESOTA, ASSIGNORS TO THOMAS B. WALKER AND SARAH E. WILSON, OF SAME PLACE.

CASH REGISTER, INDICATOR, AND RECORDER.

SPECIFICATION forming part of Letters Patent No. 526,401, dated September 25, 1894.

Application filed December 21, 1891. Serial No. 415,794. (No model.)

*To all whom it may concern:*

Be it known that we, PETER J. LANDIN and FLETCHER L. WALKER, of Minneapolis, in the county of Hennepin and State of Minnesota, have invented certain Improvements in Cash Indicators, Registers, and Recorders, of which the following is a specification.

The objects of our invention are in brief as follows: first, to provide a machine which will be easy of operation and simple of construction, which renders unnecessary fine adjustment of parts, and in which the principal operating parts are connected to and rotated on a common fixed center, and also a machine in which any one of the desired number of keys may be operated in any order or all at the same time; second, to provide a machine of the class described which will indicate or show the amount in dollars and cents of each transaction or purchase in regular reading order, and which will also indicate the nature or class of such transaction and indicate and register the character or initials representing the person making the same; third, to provide a machine which will indicate and keep an account of each separate amount received or paid out, change made, or any other similar transaction; fourth, to provide a machine in which the money drawer or receptacle is covered or made inaccessible by means of a swinging door or gate which shall be secured and locked by a combination lock; fifth, to provide a machine which shall make a total addition of the amount of money which has been indicated and registered at any given time and in which the carrying figures are transferred on the adding wheels by means of the movement of the aforesaid gate.

Other objects of the invention will appear from the following detailed description taken in connection with the accompanying drawings, in which—

Figure 2:
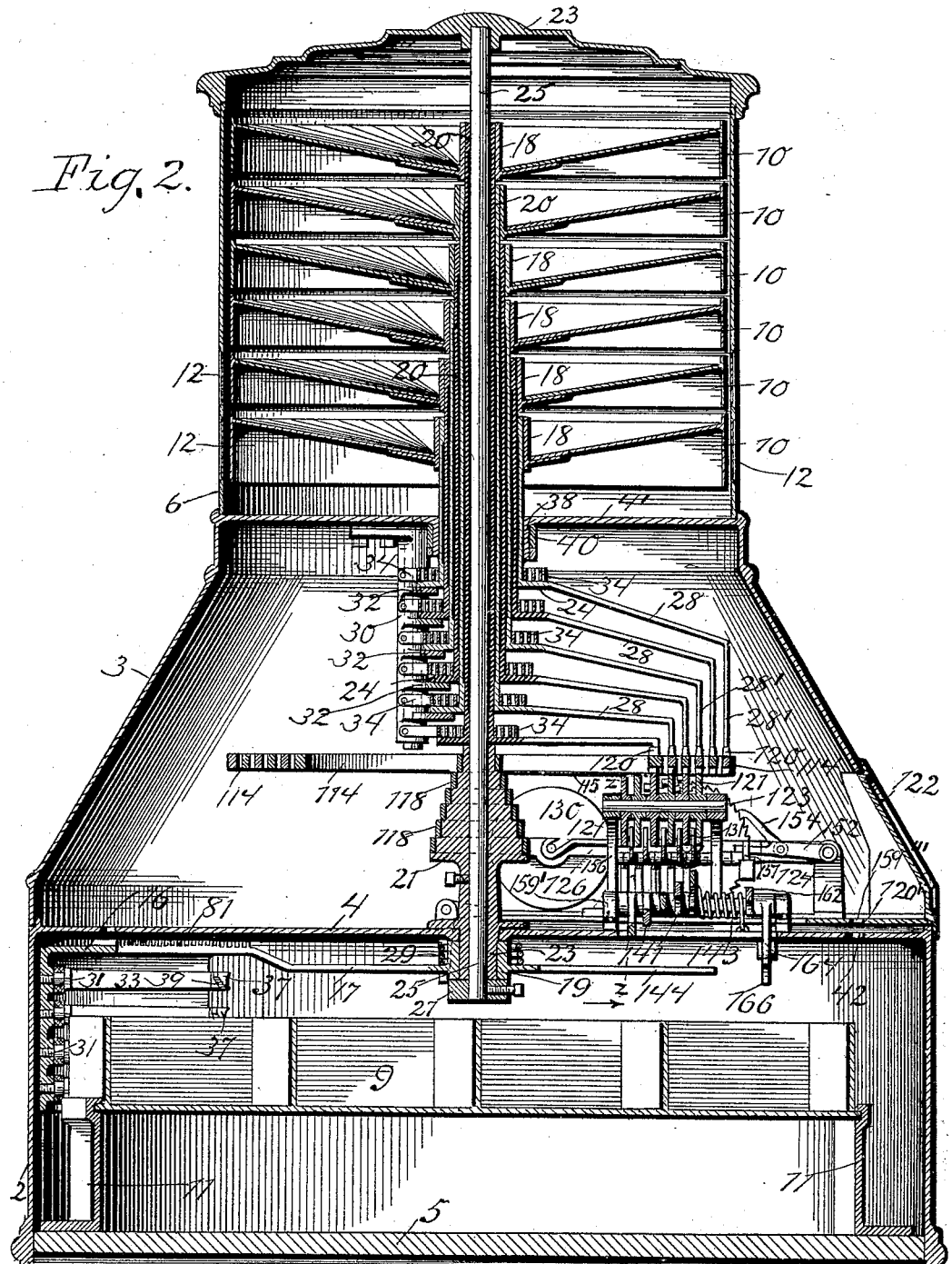
Figure 3:
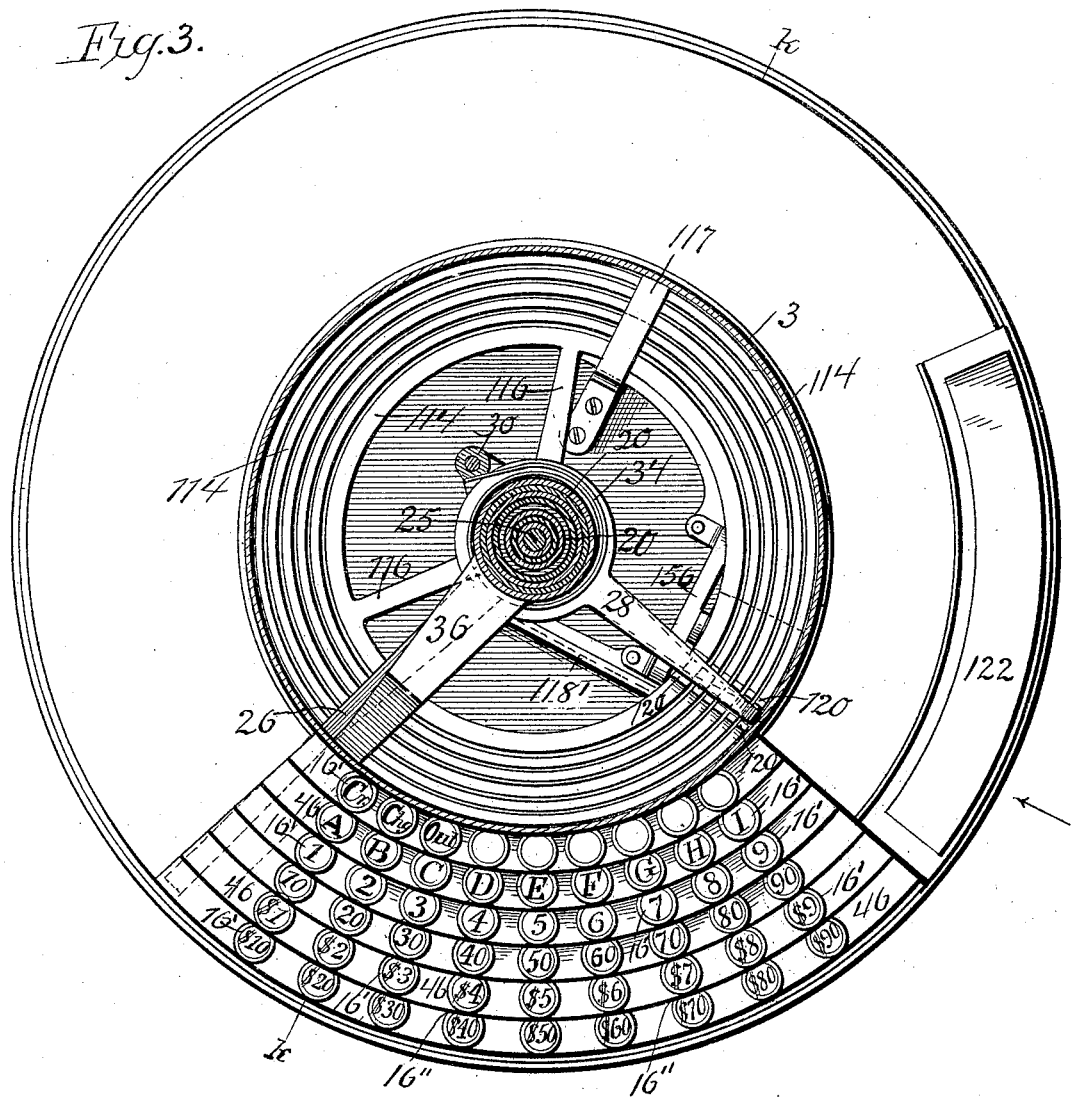
Figure 4:
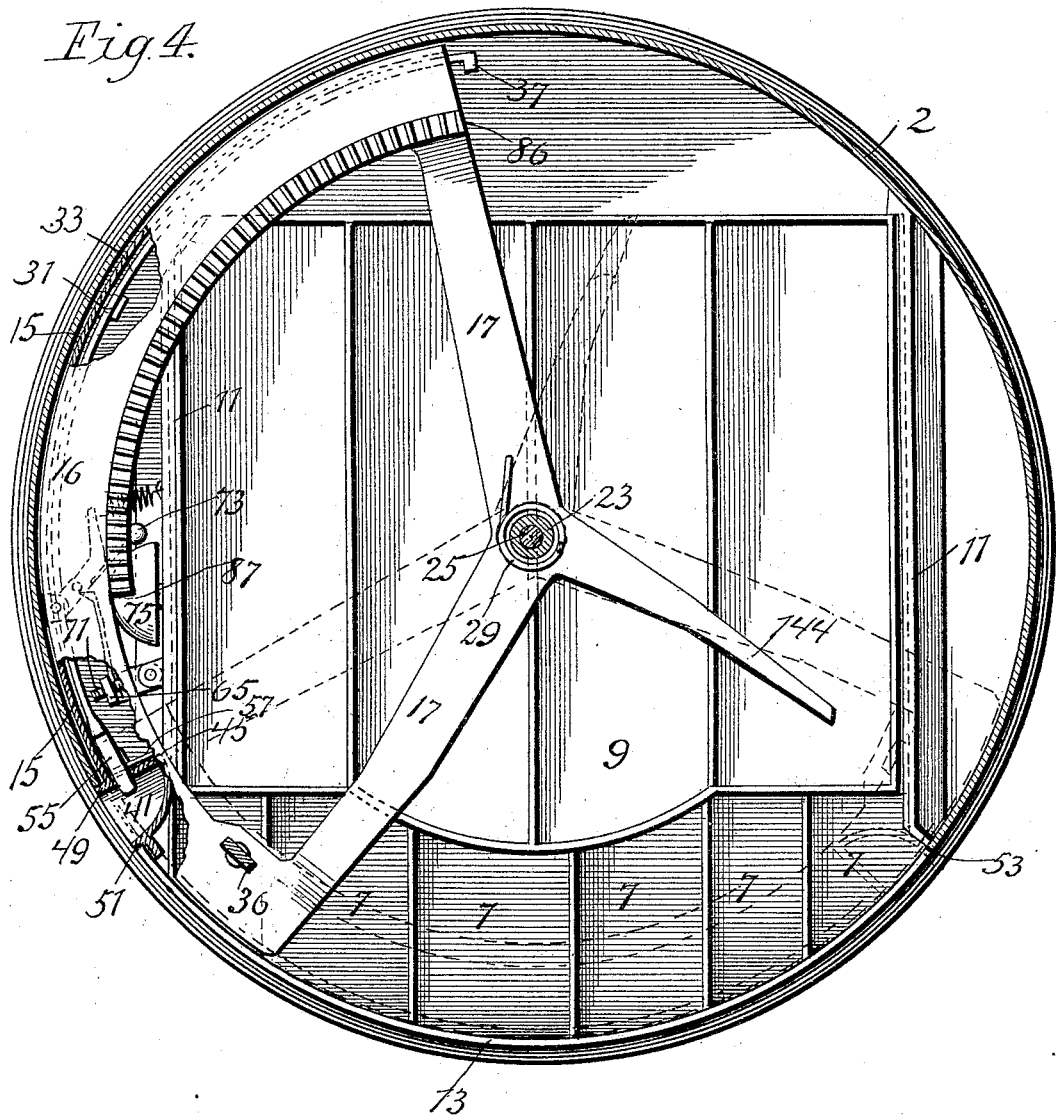
Figure 5:
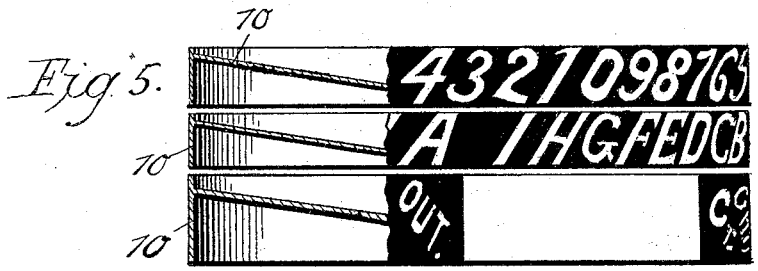
Figure 6:
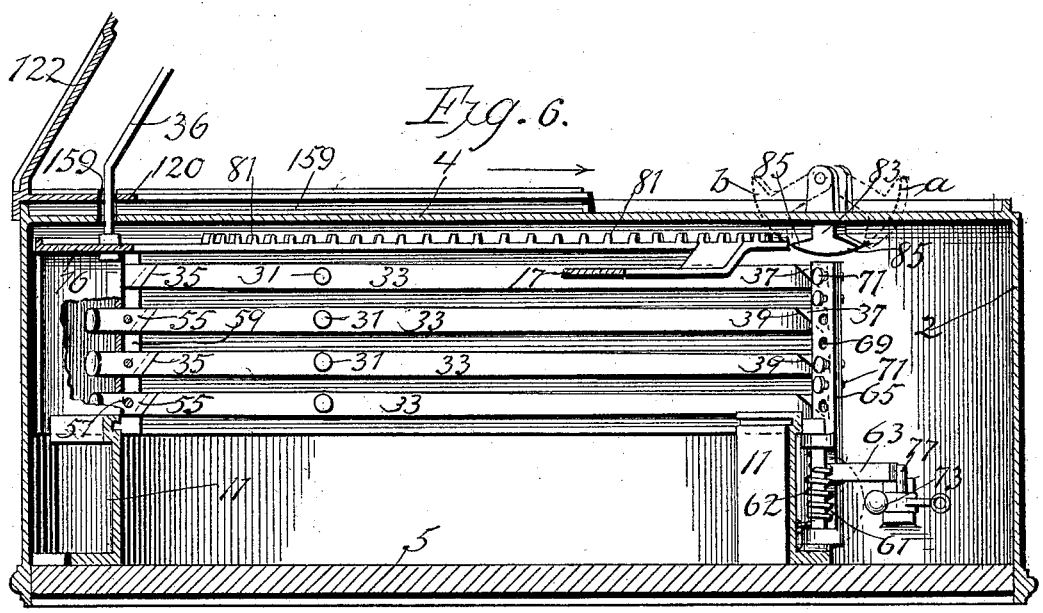
Figure 7:
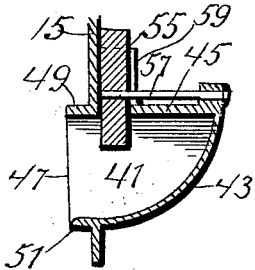
Figure 8:
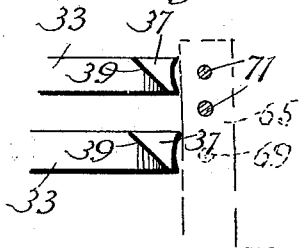
Figure 11:
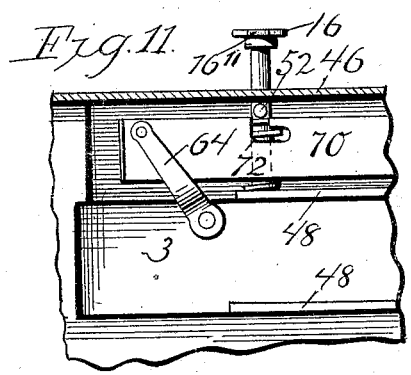
Figure 12:
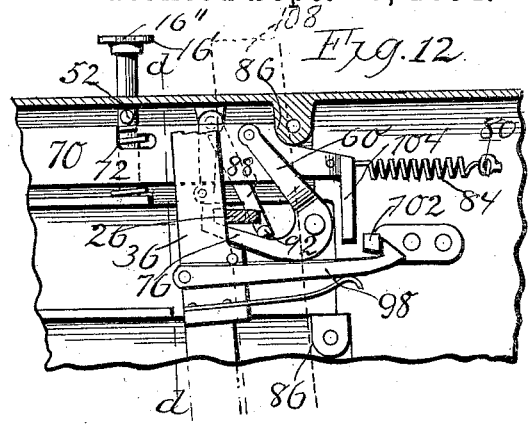
Figure 13:
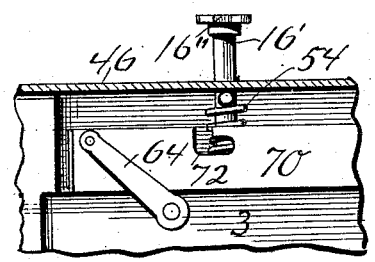
Figure 14:
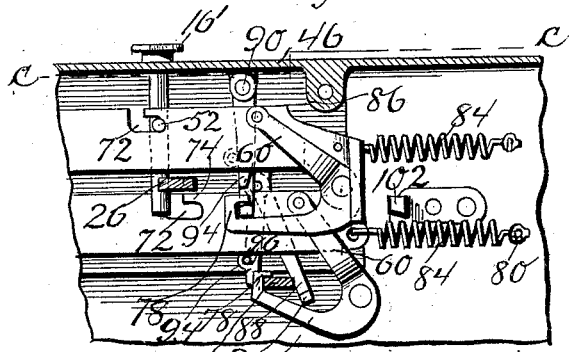
Figure 15:
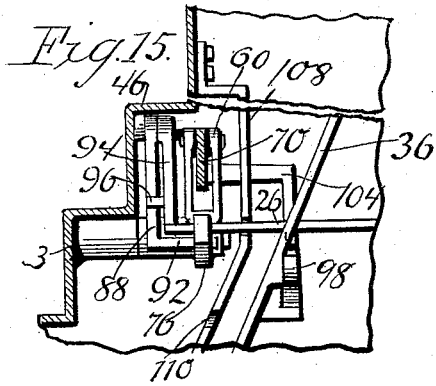
Figure 16:
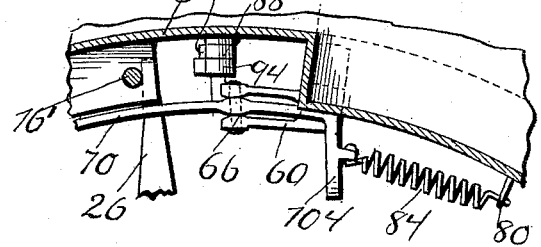

Figure 1 shows a side elevation of our machine in position for operation having the money receptacle uncovered and showing the parts which are supported on the lower front section of the outer casing in section, said casing being broken away at $k—k$ of Fig. 3 and looking in the direction of the arrow in the same figure. Fig. 2 is a vertical section on the line $x—x$ of Fig. 1 looking in the direction of the arrow "$a$" of said figure. Fig. 3 is a horizontal section on the line $y—y$ of Fig. 1. Fig. 4 is a similar section on the line $v—v$ of Fig. 1. Fig. 5 is a detail view of the three lower indicating wheels partly in section. Fig. 6 is a vertical section on the line $b—b$ of Fig. 1 showing the money drawer or till removed, the cover or gate closed and looking in the direction of the arrow "$b$." Figs. 7 and 8 are details of the combination lock shown. Fig. 9 is a side view of the recording mechanism. Fig. 10 is a detail of the adding wheels and adjacent parts, taken on the line $z—z$ of Fig. 2 and looking in the direction of the arrow in said figure. Figs. 11 and 12 are detail views seen from the center of the machine, of the respective right and left extremity of one of the segmental lock plates and its connection when unlocked and before being operated upon. Figs. 13 and 14 are similar views showing the position of parts after they have been operated upon, and showing also in Fig. 14 the next plate and connections below when unlocked. Fig. 15 is a vertical section on the line $d—d$ of Fig. 12. Fig. 16 is a horizontal section on the line $c—c$ of Fig. 14. Fig. 17 is a horizontal section through the step portion of the front of the casing in which the registering keys are supported, showing one row of keys in section and a modified construction of the mechanism for locking and releasing the aforesaid keys. Fig. 18 is a detail view of the modified construction shown in Fig. 17, showing a rear elevation of portions of the three upper rows of keys and the locking and releasing mechanism. Fig. 19 is a vertical section on the line $x—x$ of Fig. 18. Figs. 20 and 21 are details.

In the drawings, 2 represents the lower portion of the substantially circular casing 3, which has the horizontal partitions 4 and 4' and the bottom or base 5. Within the lower casing 2 are secured the money receptacles 7. Above said receptacles is arranged the money drawer or till 9, which is adapted to slide in the grooved standards 11 Figs. 2 and 4. The front portion of the casing 3 is cut away to form an opening 13 for the purpose of giving access to the money receptacle and drawer. A semi-circular plate or gate 15 Fig. 4 is adapted to close the opening 13 and be secured by the combination lock hereinafter described. The gate 15 has the horizontal top 16 to which the arms 17 are integrally connected. In the center of the machine and secured on the horizontal partition 4 is a cone-shaped standard 21 having the downwardly projecting part 23 on which the gate 15 through the arms 17 and hub 19 is supported and adapted to rotate. Supported in the standard 21 below and in the cover or top 23 of the machine above is the vertical center shaft 25. A collar 27 is secured to said shaft at its lower end upon which the hub 19 of the gate 15 rests. A coiled spring 29 has one end secured in the partition 4 and the other in one of the arms 17 and tends to hold the gate 15 closed.

The construction of the combination lock before referred to is as follows: Pivoted to the gate 15 at 31, as shown in Fig. 6, are the gravity levers 33 having on one end the vertically inclined planes 35 and on the other the projections or lugs 37 with the beveled under surface 39 Fig. 8. In the gate 15 and at its right hand end when closed, as indicated by dotted lines in Fig. 4, is formed a finger catch or recess 41 consisting of the vertical walls 43 and 45 and bottom 47 as shown in detail in Figs. 4, 6, and 7. The wall 45 has a projection 49 which strikes against the casing 2 when the gate is opened to the full extent of its movement, and the wall 43 has a similar projection 51 which strikes against said casing at 53 on the opposite side of the opening 13 when the gate is closed.

Through openings in the wall 45 extend the slides 55 having on one end a vertically inclined plane engaging the plane 35 on the levers 33. The other end of the slides 55 projects through the wall 45 into the open space of the recess 41, thereby enabling the operator to push said slides some distance, and depressing one end of the lever 33 and raising the other. Springs 57 secured to the wall 45 and passing through the slides 55 serve to keep the slides from turning and also hold said slides projecting through the wall 45. Supports 59 are provided between the several slides 55. Pivoted on the standard 11 is the yoke 61 Figs. 4 and 6 from which the spring dog 63 projects and also the extension 65 which is provided with the screw threaded holes 69 and screws 71. The yoke 61 is held in its normal position by means of a spring 62. Upon the frame 2 of the machine is located the bell hammer 73 arranged to strike the bell 75. It is provided with the pin 77 which is situated in the path of the spring dog 63. The screws 71 are arranged in combination, that is, they are so arranged that they project in the path of any predetermined lug 37 on any of the arms 33.

Referring to Figs. 6 and 8 it will be seen that the lug 37 on the first and third arm 33 will strike the first and third screw respectively if any attempt is made to open or move the gate. A further movement of said gate will cause the yoke 61 to be swung upon its pivot, the spring dog thereby engaging the bell hammer, and the bell will be sounded. If the first and third slides 55 are pushed against the inclined planes 35 of the levers 33 the lugs 37 will be raised up out of the way of the respective screws and the gate is free to be swung open. Upon returning, the lugs 37 are raised above the screws 71 by means of the beveled under surfaces 39. If in addition to the first and third the second or fourth slide is moved the corresponding lug 37 will engage the screw above and cause the bell to be rung. It will be seen that the several screws may be placed in different positions to make any desired combination.

For reasons hereinafter described we provide means which renders it impossible to return the gate after it has been moved some distance in any direction until after having completed its full movement. To this end the horizontal portion or top 16 of the gate 15 is provided with a series of teeth 81. A gravity pawl or dog 83 having the two opposite projections 85 Fig. 6 is pivoted upon the partition 4. It extends down on a line with the top of the gate 15 and is free to swing through an opening in the partition 4. As the gate 15 is moved in the direction of the arrow in Fig. 6, the forward edge 86 thereof will strike one of the projections 85 and cause the pawl to be raised to the position shown by the dotted lines $a$ in said Fig. 6, when the teeth 81 will be engaged by and slide under the projection 85, and any reverse movement of the gate will thus be prevented. As soon as the gate has moved to its limit the pawl 83 drops off the rear edge 87 of the teeth and the gate is then locked by means hereinafter described. On being returned the edge or shoulder 87 strikes the pawl and raises it to the position indicated by the dotted lines $b$ in Fig. 6 when it will prevent any reverse movement until it again drops off the edge 86 when the gate is closed and assumes the position shown by full lines in Fig. 6. It will thus be seen that any reverse movement while moving in either direction will be impossible as soon as the pawl 83 engages the teeth 81. Within the upper part of the casing in the tower and supported on the central shaft 25 is the series of indicating wheels 10 the four upper wheels of which indicate the amount registered in dollars and cents, the next below shows the letter or character representing the person or clerk making the registration and the lower wheel shows the kind or nature of the registration made. The circumference of the wheel is divided into four equal sections. The figures from 0 to 9 are provided in each section on the four upper wheels. The next lowest wheel has any chosen letters or characters arranged in the same order on each section, preferably letters in alphabetical order, and the lowest wheel is provided with characters indicating the kind of transaction usually made as for instance "Credit," "Change," "Paid out," &c. (See Fig. 5.) Opposite each wheel, on four sides of the casing 6, is provided the series of glass covered openings 12. The four upper rows of openings are arranged in diagonal rows, as shown in Fig. 1. The wheels 10 are adapted to move independently of each other and their movement is controlled or stopped by a series of registering keys 16' arranged in semi-circular horizontal rows or banks on the front part of the casing 3, as shown in Figs. 1 and 3. The means by which this is accomplished is as follows:—The hubs 18 of the wheels are secured to hollow tubes or shafts 20 as shown in Fig. 2. These tubes are telescoped but form bearings only at the top and bottom for the purpose of lessening friction. Each tube is provided at its lower extremity with the flange 24 and and also with arms 26 and 28 extending therefrom. A bracket 30 having shelves 32 is secured to the partition 4' of the casing 3. The flanges 24 of the tubes 20 rest upon said shelves 32. The exterior tube of the series is the shortest and its flange rests on the uppermost of the aforesaid shelves. To its upper end is secured the lower wheel 10 in any suitable manner. The next tube telescoped within it projects some distance above and below it and its flange 24 rests on the second shelf. Each succeeding tube toward the center thus has a greater length than the one preceding it, and to its upper projecting end is secured the next wheel above and the flange on its lower end rests on the next shelf below. The inner tube has the greatest length and is supported on the standard 21 before described and is connected to the upper wheel. It will be seen that each wheel is supported separately and may have motion imparted to it independently. Spiral springs 34 have one of their ends secured to the bracket 30 and the other end to the tubes 20, and thus tend to turn the wheels on their axes. Supported on bearings 38 on the partition 4' of the casing 3, through which the tube 20 passes, is the diagonally depending arm or lever 36, its upper end forming the hub 40 adapted to revolve on the bearings 38 Fig. 2, and its lower end passing through a semi-circular slot 42 in the partition 4 and secured to the top of the gate 15 below said partition. The arms 26 project into the path of said lever 36, and as the gate is swung open, the lever 36 being secured to it and revolving on the same center, any of the arms 26 in the path of the same are carried with it. There are as many rows of keys 16' as there are indicating wheels in the tower 6 and the extent of the movement in one direction of said wheels is controlled by any one key in the corresponding row. For example, the upper bank of keys controls the movement of the lower wheel, the next row below controls the wheel above, and so on. The heads of each row of keys, as shown in Fig. 3 are designated or marked to correspond with each of the four sections of the respective wheel. To prevent the keys from turning the heads have a flat portion 16" Figs. 11, 12, 13 which bears against the casing. The stems of the keys are supported in suitable ways in the steps 46 and the inwardly projecting flanges 48 and are capable of a slight vertical movement in the same. Said stems are provided with pins or stops 52 and springs 54 which bear against said pins and also against the flanges 48 Figs. 11 to 17 of the frame whereby they are supported in a raised position. As any one of the keys is depressed it projects below the flanges 48 and is locked in this position by the following means, which also serves to lock all the remaining keys in the same row so that they cannot be operated until again released. Pivoted upon the inside of the front of the casing, to the right and left respectively of each series of registering keys, are the inclined forked rocker arms or links 60 and 64. Connected to said links by means of a rounded joint 66, as shown in Fig. 16 are the curved plates 70 which are provided with a series of right angled slots 72 consisting of a vertical and a horizontal part, thus forming a lug 74. The vertical parts of said slots normally coincide with the pins 52 provided on the stems of the keys 16 and projecting over said part Figs. 11 and 12. The links 60 have the arms 76 which in their normal position have a slight inclination Fig. 12, and are provided with the hook shaped ends 78 adapted to form a lock for the arms 26. A tension spring 84 is connected to the plates 70 and to the casing at 80 and normally keeps the said plates against the stop 86. A gravity dog 88 Figs. 12, 14 and 15 is pivoted on the casing 3 at 90, and has the horizontal extension 92 projecting above and engaging the arm 76 of the link 60. A second gravity dog 94 Figs. 14 and 5 is also suspended from the pivot 90 and a pin 96 on said dog is adapted to engage the dog 88.

By referring to Figs. 11 and 12 it is seen that as one of the keys 16 is depressed, the pin 52 will enter the vertical part of the slot or notch 72 until it strikes the bottom, when a further downward movement will cause the plate 70, through the inclined pivoted links 60 and 64 to move slightly in both a vertical and a horizontal direction. In other words, it will describe an arc of a circle, thereby causing the projection 74 to pass above the pin 52. As the plate 70 is pressed downward and the links 64 and 60 rocked on their pivots the inclined surface of the arm 76 will assume a horizontal position, thereby permitting the vertically inclined gravity dog 88 resting on the arm 76 to swing around to a perpendicular position when it will prevent any upward movement of the arm 76 and thereby lock the plate 70. The parts have then assumed the position shown in Fig. 13 and the upper part of Fig. 14 where the depressed key is seen to be locked by the projection 74 of the plate 70, and the plate 70 to be locked by the dog 88.

The means whereby as the gate 15 is opened, the indicating wheels 10 in the tower 6 are brought to zero, the cover 15 and also the wheel 10 locked until registration has been made, and the operator in depressing his respective letter key unlocks the gate which returns to its original position, releasing the wheels 10 which then show or indicate on four sides the registration made, are as follows:—The inclined depending or releasing lever 36 is provided with the spring catch 98 Figs. 1, 12, and 15 which is adapted to engage a lug 102 secured upon the casing 3. The lever 36 being connected to the cover 15 said cover will also be locked. The left hand end, as seen from the front of the machine, of the second upper plate 70 or the plate operated by the series of registering keys designated by alphabetical letters, has an extension or projection 104 Figs. 12, 15 and 16 which is in a position to engage the spring catch 98 and release it when the said plate is depressed by one of the letter keys. As the horizontal arms 26 connected to the indicating wheel 10 in the manner heretofore described, extend in the path of the vertical lever 36, which is connected to the gate 15, it will be seen that as the gate 15 is opened or swung around from right to left any of the arms 26 situated within the compass of the circle described by the lever 36 will be engaged by, and carried around with said lever until it is locked by means of the spring catch 98 and lug 102, as shown in Fig. 12 when the arms 26 are held by the lever 36 and the wheels 10 in the tower indicate zero. Before coming to a stop the arms 26 will engage and pass by the gravity dog 94 which in turn will engage the dog 88, swing it back to the inclined position and permit the links 64 and 60 to turn on their pivots by the action of the spring 84 and thereby return the plate 70 to its normal position, which is that shown in Fig. 12 and in the lower part of Fig. 14. Any of the keys 16' which may have been depressed are released from the plate 70 and returned to their original position by the action of the springs 54. The arms 26 are held out of engagement with the hook 78 of the arm 76 by means of the lever 36 when said lever is locked as indicated in Fig. 12. The stems of the keys 16' are normally flush with the under side of the flanges 48 but project below the same after having been operated upon as before stated. The outer extremities of the arms 26 travel underneath and in close proximity to the flanges 48 and the key stems when depressed come within the circle described by said arms, as shown most clearly in Figs. 12, 14 and 16, and are thus in a position to form a stop to the movement of said arms. If, when the desired amount has been registered, one of the letter keys is finally depressed, releasing the lever 36 as above described, the arms 26 are thereby made free and caused to revolve on their bearings by means of the tension constantly exerted by the springs 34. The arms 26 controlled by any one of the series of horizontal rows of keys of which a key has been operated upon will be free to move until stopped by the projecting end of the operated key, when the corresponding wheel 10 carried by it will indicate the figure marked on said key. Any arm 26 belonging to a row of keys which has not been operated will be stopped and held by the hook 78 of the arm 76 as indicated clearly in Fig. 14. All the keys in the last named row will then be locked by reason of the hook 78 of the arm 76 which then extends over the arm 26, and said arm will thus prevent the plate 70 from being depressed and it will be impossible to operate any of the keys. We prefer to provide a bracket 108 on the casing 3, as shown in Fig. 15 and indicated by dotted lines in Fig. 12, having notches 110 in which the arms 26 enter when in a locked position for the purpose of bracing said arms in case any force should be exerted upon any of the keys.

The mechanism we employ to keep a separate record of each transaction is as follows: Upon the cone shaped standard 21 before described, we provide bearings preferably arranged in steps which are adapted to support the horizontally revolving rings or wheels 114 by means of the connecting arms 116 as shown in Fig. 1. Said arms have the hubs or collars 118 which are adapted to revolve on the bearings of the standard 21 and rest on the shoulders formed by the steps of the same. The arms 28 connected to the tubes 20 as heretofore described have the downwardly projecting portions 28' which engage lugs 120 on the wheels 114 and hence any motion of said arms will be imparted to the said wheels. Adapted to slide on suitable ways 118' on the horizontal partition 4 of the casing is the frame or slide 120' carrying the recording devices, (Figs. 1, 2, 9 and 10.) An opening is provided on the side of the casing which is covered by the end 122 of the frame or slide when closed. A suitable lock may be provided on said frame. Standards 124 are secured on the frame 120'. A swinging frame 126, supporting the feed roll 128 and the supply roll 130, is pivoted to the standards 124. The forward end of the frame 126 has the upwardly extending lugs 132 in which is journaled the printing roll 134. Paper 146 is supplied on the roll 130, carried around the printing roll 134 and into the roll 128. The frame 126 has also an extension 136 projecting downward through an opening in the frame 120' which forms a guide for the same. A lug 138 is provided on the extension 136 which is adapted to be engaged by the gravity dog 140 mounted in bearings 142 on the floor or partition 4, and extending below the same. The gate 15, as before stated, has arms 17 and it is also provided with an arm or lug 144 shown most clearly in Figs. 2 and 4. The downwardly projecting portion of the dog 140 is situated within the path traveled by the arm 144 Fig. 9 when the gate is rotated. The printing roll 134 is situated in close proximity to the under surfaces of the wheels 114 which surfaces are provided with the dies or types 115. Said dies are designated to correspond with the registering keys 16 and also with the indicating wheels 10. Opposite the printing roll 134 and above the wheels 114 is the cross bar 117 which is supported on the floor 4 and serves as an anvil.

Referring to Fig. 4 it will be seen that as the gate 15 is swung open or from the position shown in dotted lines in said figure to that shown in full lines, the arm 144 will move in the direction shown by the arrow in Fig. 9, thereby engaging the depending portion of the dog 140 rocking it upon its axis, raising the printing roll and the paper 146 against the under surface of the wheels 114, and the character of any of the dies 115 situated over said wheel are imprinted upon the paper 146.

To move the paper after each imprint of the dies we employ the following means: The feed roll 128 is provided with ratchet teeth 148, a pawl 50 engaging said teeth and preventing any reverse movement thereof. A lever 152 is pivoted upon the standard 124 and is provided with a pawl 154 which is adapted to engage the ratchet teeth 148. Upon a frame 156 which is arranged on the frame or slide 120' is a pivoted lever 157 Figs. 1 and 10 having a forked end 158 which engages the lever 152. This lever has a weight 158' upon its opposite end or a spring may also be arranged on the same. Journaled in bearings 159' on the partition 4 is a short shaft 160 upon which is secured an arm 162 shown in Figs. 1 and 2. To the shaft 160 is also secured the depending arm 164 provided with the pivoted catch 166 which is prevented from turning in one direction by the shoulder 168, Fig. 10, while it is free to swing in the opposite direction. The catch 166 extends down in the path traveled by the arm 144 connected to the gate 15 as heretofore described, and as the said gate is opened the lug 144 first engages the dog 140 which makes the imprint and passing by it next strikes the catch 166, thereby rocking the shaft 160 and raising the arm 162 until it in turn raises the weighted portion of the pivoted lever 157, and by thus depressing the opposite or forked end connected to the lever 152, the pawl 154 provided on said lever moves the wheel one notch. The weighted end of the lever 157 causes the parts to be returned to their original positions as soon as the catch 166 is disengaged from the lug 144. A pin 159'' on the frame 156 is adapted to stop the downward movement of the weighted end of the lever 157, and thus regulates the movement of the feed roll 128.

For the purpose of making a total addition of each amount registered we employ means as follows: The four inner wheels 114 whose movements are controlled by the four lower rows of keys 16', through the arms 28 and 26 are provided on their under surface with the ratchet teeth 119, Figs. 1 and 2. A series of adding wheels 121 are mounted on a shaft 123 on the frame 156 and are provided with ten ratchet teeth 125 on their circumference. The teeth 125 of the wheels 121 are marked with the figures from 1 to 10 and are adapted to engage the teeth of the wheels 114 and any motion imparted to said wheels 114 is communicated to the wheels 121. The keys 16' of the third upper row (which are designated cents) control or stop the motions of the third wheel 114 (as counted from the circumference of the series) which imparts motion to the adding wheel 121 representing units. The keys of the next series or those marked with figures from 10 to 90 also representing cents, stop the motion of the next wheel 114 toward the center of the machine, and control the second adding wheel, which represents tens. Further, the keys in the following row, or those marked from $1 to $9 control the following adding wheel to the left, or the hundreds wheel. The keys of the lowest row, or that marked from $10 to $90 control the next following wheel or that representing thousands. Additional wheels may be provided to represent tens and hundreds of thousands.

We provide mechanism whereby the opening of the gate 15 furnishes the means of adding the carrying figure of each wheel to the total on the next wheel which is as follows: A space is left between each pair of the adding wheels 121. Pins 127 Figs. 2 and 10 are secured in said wheels and extend from right to left into this space. Levers 131 are pivoted on a rod 133 of the frame 156 and extend between the wheels. The extreme ends of the levers 131 are beveled off in both directions. Springs 135 having the catches 137 and 139, which are arranged to receive and hold the beveled ends of the levers 131 are secured to the frame 156 Figs. 1 and 10. The levers 131 carry the pawls 141'' which are adapted to engage and impart motion to the next wheel to the left, or the wheel representing ten times as great value. Inclined shoulders 146 on the levers 131 project in the path traveled by the pins 127 of the wheels 121. When said wheels have nearly completed one revolution and thus located the pins 127 in a position to engage the inclined shoulders 146 of the levers 131, a further movement of the wheel will cause the lever 131 to be forced down to the position shown by one of the levers in Fig. 10, in which position it is held by the catch 139 on the spring catch 135. The shaft 160 has secured to it a series of lugs 141 preferably formed in a single piece. A coiled spring 143 (see Fig. 2) on the shaft 160 is adapted to hold said lugs in a nearly horizontal position by bringing the depending dog 164, which is also secured on the shaft 160 as before described, against the stop 145. Each of the lugs 141 is in a vertical line with one of the levers 131. The end of the lug 141 located on the right hand side (or the unit side) of the wheels 121, is arranged considerably higher than the shaft 160 and the end of each succeeding lug, toward the left, is some distance lower than the preceding one. When the gate 15 is swung open and the lug 144 engages the catch 166 of the dog 164 thereby revolving the shaft 160, the lugs 141 are given an upward movement, and any of the levers 131 which may be situated in the lowest catch 139 and consequently in the path of the lugs 141 will be forced back to the catch 137 in succession, and the pawls 141″ which act on the next wheel in the series, will move said wheel one notch. As soon as the arm 144 disengages the catch 166 the lugs 141 return to the original position. Flat springs 147 secured to the frame 156 and bearing on the teeth of the wheels 121 serve to hold the wheels in their set position. It is thus seen that as any of the wheels 121 complete one revolution or add tens, or hundreds, or thousands, the carrying figure is communicated and added to the wheel next to it of a higher value by the swinging back of the gate 15. The construction of the adding device is thereby rendered exceedingly simple.

To ascertain the amount registered the slide or frame 12′ is unlocked and partly removed. The total may then be seen on any determined tooth of the wheels, as for instance at 149, or a cover for the wheels having a suitable opening may be provided. It will be understood that in order to show the right total it is necessary before removing the slide or frame to transfer any remaining carrying figures, by opening the gate. A slot 159‴ Fig. 2 is therefore provided in the frame or slide into which the lever 36 enters when the gate is closed, thereby making it impossible to remove the frame or slide before opening the gate. As the gate cannot be returned until having completed its full movement the transferring of the carrying figures which occurs in the last part of the movement is insured. Before replacing said frame the wheels may be brought to zero by any suitable means.

The operation of the machine is as follows: The gate to the money receptacle is unlocked by means of the combination and swung from right to left, thereby bringing the indicating wheels to zero, printing or punching the amount previously registered, transferring the carrying figures of the adding wheels and unlocking the registering keys. To register a certain sum as for instance, three dollars and seventy-five cents, the operator depresses the key marked $3. in the second lower row, also the key marked 70 or seventy cents in the row above, and the key marked 5 or five cents in the next row above. If the amount registered represents cash received the key in the upper row marked "Credit" is also depressed. These keys may be operated in any order or all at the same time as may be most convenient. The change is then made, and as the operator finally touches the key in the second row, which is marked by the letter representing said operator, for instance, "C," the gate or cover is released and returns to its closed position by the action of its spring when it is again locked by the combination lock. The indicating wheels belonging to a row of keys in which a key has been operated upon are then free to turn on their axes and revolved by the action of their respective springs until they are brought to a stop by their connecting arms coming against the depressed keys when the same figures or characters will be shown through the openings in the tower of the machine as those marked upon the depressed keys, viz: 3.75. credit "C." Any wheel belonging to a row of keys which has not been operated is not permitted to revolve and will therefore indicate zero. As the wheels swing around the notched annular rings connected thereto and operating the adding wheels are carried around with them, thereby revolving said adding wheels the same number of teeth as their connecting stopping arm travels spaces of the same length as the distance between two keys. The exact amount indicated by the wheels in the tower is thus registered on the adding wheels. The dies representing the characters of the registered keys are stopped opposite the printing roll in a position to be acted upon by the same. The machine is then ready for the next operation.

It will thus be seen that we provide a machine in which the keys are registered upon and the indicating wheels show the amount registered in regular reading order which is of great advantage.

In place of the locking and releasing mechanism shown in detail in Figs. 11, 12, 13, 14, 15 and 16 we generally prefer to use the construction shown in Figs. 17, 18, 19, 20 and 21 as being simpler and more cheaply made.

For the purpose of supporting the curved plates 70 we secure the angle piece 165 to the casing 3 opposite the plates 70, preferably one near each end, and another near the centers of the plates 70 by means of the screws 167. Screws 169 preferably provided with rollers 171 pass through longitudinal slots 173 in the plates 70 and are secured in the angle piece 165. The slots 173 allow of a horizontal movement of the plates 70 and the rollers 171 lessen the friction and make the movement easy. In the upper part of the plates 70 are formed the vertically inclined slots 175 corresponding to the slots 72 in the other form of the invention. When the plates 70 are in a normal position the entrances to the slots 175 are in vertical alignment with the pins 52 of the keys 16. The lower portions of the slots are enlarged, thereby forming the lugs 177 projecting in a horizontal direction above the lower parts of the slots 175. Pivoted on the casing at 183 are the gravity dogs 179 having the catches 181 and cams or inclined surfaces 185, extending alongside of the plates 70 at their left hand, as seen from the front of the machine. Inclined planes 187, formed on the plates 70 are adapted to engage the inclined surfaces 185 of the dogs 179 and raise said dogs when the plates 70 are moved in a horizontal direction. A narrow space 180 is left between the two inclines for a purpose hereinafter described. The slots 175 incline in opposite directions from the surfaces 185 and 187. Strips 191 are secured to the plates 70 and overlapping the dogs 179, thereby form guides for the same. The strips 191 project slightly below the lower edges of the plates 70 thus forming the shoulders 193. A projection 195 on the strip 191 of the second upper plate 70 extends at an acute angle thereto and is in a position to engage the shoulder 193 of the upper plate. The strip 191 of the second upper plate is also provided with a projection which has an inclined surface 192 adapted to come in contact with a similar surface 194 on the spring catch 98 Fig. 21 of the vertical lever 36, as indicated in dotted lines in Fig. 18. The strip 191 of the second upper plate has also a downwardly projecting extension 197 which is in a position to engage the rear end of all the lower plates.

The operation is as follows: As the gate 15 is rotated when opened the arms 26 being carried around with it strike the shoulders 193 and thereby move the plates 70 sufficiently to permit the dogs 179 to drop into position to engage said arms 26. When one of the registering keys is thereafter depressed its pin 52 enters the corresponding inclined slot 175 of the plate 70 thereby forcing said plate in a horizontal direction. The first movement of the plate which corresponds to the distance between the inclines 185 and 187 causes the lugs, 77 to pass beneath the pins 52 of all the remaining keys in the same row, when said keys are locked and it is then impossible to depress any one of them. As the key is further depressed the incline 187 will engage the inclined surface 185 of the gravity dog 179 and raise it up out of engagement with the arm 26. The lug 177 has then passed over the pin 52 of the depressed key and prevents its returning. The parts are then in the position shown by the upper plate of Fig. 18. The arm 26 is then held by the vertical lever 36 through the spring catch 98 as indicated in dotted lines in the same figure. It will be seen that one or more of the plates 70 may be operated upon at the same time. After registering the desired amount when the second upper plate 70 is finally struck, the first movement of the plate locks the keys belonging to that plate. By the further movement, the extension 197 or projection 195 engages any of the plates which may not have been operated upon imparting a slight movement thereto equal to the space between the inclines 185 and 187 and thus moving the plate without moving the dogs and locking all the keys belonging to said plates. By this time the spring catch 98 of the lever 36 has been forced out of engagement with the catch 102 through the inclined surfaces 192 and 194, the lever 36 is released, the gate 15 closes and any of the arms 26, which are not held by the dogs 179, fly around until they come to the proper stop, formed by the depressed keys. Any and all of the keys are then locked until in the next operation the gate is again opened and the arms 26 carried around until they strike the shoulders 193 of the strips 191 when by a further movement all the plates are returned to the former position, the lugs 177 disengage the pins 52 of the depressed keys which return to their original position, the lever 36 is again locked by the spring catch 98 and all the registering keys are free to be operated upon. It will also be seen that it is impossible to tamper with the mechanism of the machine, as the registering keys are not directly connected to the principal parts of the machine but are simply employed to release and stop their motions.

We claim as our invention—

1. In a cash indicator, the combination of the several series of keys, a cash receptacle, a gate or cover for closing the said receptacle, means for locking the said gate in its closed position, a series of indicating wheels, means connected with the gate for setting all of said wheels at zero as the gate is opened, a lock for locking the said gate in its open position, and a trip for releasing the gate by the operation of the keys of one set only, substantially as described.

2. In a cash register, the combination of the swinging gate or cover which closes the cash receptacle, an arm 36 carried thereby, the indicating wheels, the springs for moving the wheels in one direction, the arms 26 having connection with the indicating wheels and extending into the path traveled by the arm 36, whereby, as the gate is opened, the said arm 36 operates to move all the indicating wheels to zero, a lock or catch for holding the gate open, and means for tripping or releasing said catch when the last key is operated, substantially as described.

3. In a cash register, the combination with a cash receptacle, of a gate or cover mounted so as to swing upon an axis and carrying an arm 36, a series of indicating wheels, and a series of arms, connected with the indicating wheels, arranged in the path of the arm 36 so as to be moved thereby, substantially as described.

4. In a cash register, the combination of the gate or cover for the cash receptacle, the spring which tends to close said gate, the indicating wheels having connected therewith a series of arms, the springs which tend to move the indicating wheels and carrying the aforesaid arms in the direction in which the gate moves in closing, a projecting arm carried by the gate and adapted when the gate is open to engage with the aforesaid arms and move the wheels to zero, a catch for maintaining the gate in its open position, a series of keys arranged to determine the extent to which the springs shall move the indicating wheels, and means for releasing the gate and permitting the indicating wheels to move, substantially as described.

5. In a cash register, the combination of the indicating wheels having connected therewith the arms 26, the several series of keys adapted, when operated, to be in the path of the said arms, and to determine the position in which they shall move, the springs which operate the indicating wheels, a device for moving all of the said arms and restoring the said wheels to zero, a catch or lock for holding said device, independent catches for each of the arms 26, connections operated by the keys for moving said independent catches when the keys are operated, and means connected with one set or series of keys, only, for releasing the device, which moves the indicating wheels, from the operation of its catch or lock, substantially as described.

6. In a cash register, the combination of the indicating wheels, the arms 26 connected therewith, the springs 34 for operating the wheels, the series of keys adapted, when operated, to be in the path traveled by the said arms, a swinging gate or cover for the cash-receptacle, carrying an arm 36 adapted when the gate is moved in one direction to engage with the arms 26 and move the indicating wheels to zero, a catch for holding the gate open, independent catches for each of the arms 26, the slide-bars operated by the keys and having connection with the last of said catches, whereby as a key is operated the arm 26 of the indicating wheel which it controls is released from its catch, and means for releasing the catch which holds the gate open, substantially as described.

7. In a cash register, the combination with a cash receptacle, of a swinging gate or cover therefor, an arm 36 carried thereby, a series of indicating wheels, a series of arms connected with the indicating wheels and arranged in the path of the said arm 36, a lock for locking the gate in its open position and thereby holding the indicating wheels, the operating keys which determine the position to which the indicating wheels shall move, and means operated by one set of keys, only, for releasing the gate and the indicating wheels after all the keys have been operated, substantially as described.

8. The combination, in a cash indicator, with a cash receptacle, of a gate or cover therefor arranged upon a vertical pivot or axis, a series of indicating wheels also arranged upon a vertical axis, and means connecting said cover with said wheels, whereby as said cover is opened all of said wheels are brought to zero.

9. In a cash indicator, the combination, with a cash receptacle, of a movable gate or cover therefor, a series of indicating wheels, means for moving said wheels, means for setting all of said wheels at zero as said gate or cover is opened, a series of keys for each wheel arranged to form stops therefor, and a lock whereby as any one of said keys of a series is moved into position to form a stop for its wheel it will be locked in said position, a lock simultaneously operated for all of the other keys of such series which locks them so as to be incapable of operation, and means for releasing said wheels, substantially as described.

10. In a cash indicator, the combination with the movable gate or cover, and the indicating wheels, of means for setting the said wheels at zero as said cover is opened, means for locking said cover in its open position, keys disconnected from the indicating wheels for predetermining the position in which said wheels may be turned when released, means for releasing said cover and said wheels, and means independent of the cover for moving the indicating wheels after they have been released, substantially as described.

11. The combination, with the indicating wheels, a swinging cover for the cash receptacle, and the tubular bearings therefor, of the series of arms 26 and an arm 36 carried by the said cover for engaging all of said arms and thereby moving said wheels, substantially as described.

12. The combination, with the indicating wheels, and the tubular bearings therefor, of the series of arms 28 connected to said wheels, the wheels 114 concentric with said indicating wheels and adapted to be engaged by said arms, and a series of registering wheels engaged by said wheels 114, substantially as described.

13. The combination, with the indicating wheels and their bearings, and the springs for moving said wheels, of the arms 28 connected to said wheels, the series of wheels 114 arranged concentrically with said indicating wheels and provided with a series of type or dies and engaged by said arms 28, and means for bringing a recording strip into contact with the type upon said wheels, substantially as described.

14. The combination, with the series of indicating wheels, of the concentrically arranged wheels 114, arms connected with said indicating wheels for moving said wheels 114, and a series of registering wheels engaged and operated by said wheels 114, substantially as described.

15. The combination, with the indicating wheels, of the series of vertically arranged tubes 20 upon which said wheels are arranged, provided with suitable flanges 24, and a supporting bracket provided with a series of shelves on which said flanges rest, substantially as described.

16. The combination, with the upright shaft 25, of the series of indicating wheels, tubes, upon which said wheels are secured, mounted upon said shaft and provided with flanges 24, shelves or projections 32 engaging said flanges, springs connected with said tubes for moving said wheels, a conical bearing 21 secured upon said shaft, the series of wheels 114 supported upon said bearing, and a series of arms connected with said tubes on the indicating wheels and arranged to engage said wheels 114, substantially as described.

17. The combination, with the indicating wheels, of the concentrically arranged wheels 114 arranged to be operated from said indicating wheels, the frame or slide 120′, the registering wheels mounted upon said frame and arranged to be engaged by said wheels 114, substantially as described.

18. The combination, with the wheels 114 provided with a series of type or dies, of the frame or slide, the swinging frame mounted thereon and provided with rolls carrying the recording strip, the swinging door or gate, and means for raising said recording strip against said type wheels, as said door is opened, substantially as described.

19. In a cash register, the combination, with the cash receptacle, the swinging door or gate therefor, the operating keys, and the registering mechanism, of the combination lock, connected with the door or gate, consisting of a series of gravity levers 33 provided with the inclined planes 35 and with the lugs 37 having the beveled under surfaces 39, the slides 55 provided with inclined planes adapted to engage said inclined planes 35, and a series of screws or stops 71, substantially as described.

20. The combination, in a cash indicator, with the till or receptacle, of the swinging cover connected therewith, the series of fixed stops, the series of gravity levers arranged upon said gate and adapted to engage said stops, and a series of slides also arranged upon said gate and adapted to move said levers and bring them out of line with said stops, substantially as described.

21. A cash indicator having a series of indicating wheels mounted upon vertical axes, in combination with a cash receptacle provided with a movable cover also mounted upon a vertical axis, and means, carried by the cover, for setting said wheels at zero as said cover is opened, and means for releasing said wheels and stopping them in predetermined positions.

22. In a cash register, the combination, with the registering wheels provided with the pins, of the levers having pawls engaging said wheels and projections arranged to be engaged by the pins on said wheels, means for raising said levers, and the springs 135 provided with recesses arranged to engage and hold said levers either in an elevated or depressed position, substantially as described.

23. In a cash register, the combination, with the registering wheels provided with the pins, of the levers having pawls engaging said wheels, and projections connected with the said levers whereby the latter are operated, after being set, as the cash receptacle is opened, such levers being arranged to be operated in succession, substantially as described.

24. In a cash register, the combination, with the indicating wheels and their shafts, and means for moving the same, of the ring wheels provided with the series of ratchet notches, the registering wheels with which said ring-wheels are adapted to engage, means for holding the ring-wheels clear of the registering wheels as they move in one direction, and bringing them into engagement with said registering wheels as they move in the other direction, substantially as described.

25. The combination, with the indicating devices and the ring-wheels, of the series of registering wheels adapted to be engaged by said ring-wheels, means for holding said ring-wheels and registering wheels out of engagement with each other as the ring wheels move in one direction, and permitting them to engage as the ring-wheels move in the other direction, and means for moving said ring-wheels to correspond to the movement of the indicating devices, substantially as described.

26. The combination, with the indicating devices and the registering wheels, of the carrying device consisting of the levers each provided with a projection adapted to be engaged by a pin upon the registering wheel, the spring dogs 121 engaging the registering wheels, and the step quadrant 125 provided with the arm 129 adapted to be engaged and moved by the sliding drawer, substantially as described.

27. The combination, with the indicating wheels, of the ring-wheels provided with a series of type or characters, means connecting said wheels with the indicating wheels so that the movement of said ring-wheels corresponds to the movement of the indicating wheels, the frame carrying the recording strip, and means for raising said frame so as to bring the recording strip in contact with the type or characters upon said ring-wheels, substantially as described.

In testimony whereof we have hereunto set our hands this 17th day of December, 1891.

PETER J. LANDIN.
    FLETCHER L. WALKER.

In presence of—
 F. S. LYON,
 A. C. PAUL.